(12) United States Patent
Benson et al.

(10) Patent No.: US 11,136,215 B2
(45) Date of Patent: Oct. 5, 2021

(54) TETHER CABLE SPOOLING APPARATUS

(71) Applicants: Richard A Benson, Grand Junction, CO (US); Adam A Degemann, Grand Junction, CO (US)

(72) Inventors: Richard A Benson, Grand Junction, CO (US); Adam A Degemann, Grand Junction, CO (US)

(73) Assignee: Teltech Group LLC, Carrollton, TX (US)

( * ) Notice: Subject to any disclaimer, the term of this patent is extended or adjusted under 35 U.S.C. 154(b) by 807 days.

(21) Appl. No.: 15/986,320

(22) Filed: May 22, 2018

(65) Prior Publication Data
US 2019/0055105 A1   Feb. 21, 2019

Related U.S. Application Data

(60) Provisional application No. 62/548,075, filed on Aug. 21, 2017.

(51) Int. Cl.
| | |
|---|---|
| B65H 75/36 | (2006.01) |
| B64C 39/02 | (2006.01) |
| B64F 3/02 | (2006.01) |
| B65H 54/76 | (2006.01) |
| B65H 57/12 | (2006.01) |
| H02G 11/02 | (2006.01) |
| G02B 6/44 | (2006.01) |
| H04W 88/08 | (2009.01) |

(52) U.S. Cl.
CPC ......... *B65H 75/364* (2013.01); *B64C 39/022* (2013.01); *B64C 39/024* (2013.01); *B64F 3/02* (2013.01); *B65H 54/76* (2013.01); *B65H 57/12* (2013.01); *H02G 11/02* (2013.01); *B64C 2201/024* (2013.01); *B64C 2201/06* (2013.01); *B64C 2201/122* (2013.01); *B64C 2201/148* (2013.01); *B65H 2403/40* (2013.01); *B65H 2404/143* (2013.01); *B65H 2701/32* (2013.01); *B65H 2701/34* (2013.01); *G02B 6/4457* (2013.01); *H04W 88/08* (2013.01)

(58) Field of Classification Search
CPC .... B65H 75/364; B65H 54/76; B64C 39/022; B64C 39/024; B64C 2201/148; B64C 2201/00; B64C 2201/06; B64F 3/02; H02G 11/02
See application file for complete search history.

(56) References Cited

U.S. PATENT DOCUMENTS

| | | | | |
|---|---|---|---|---|
| 2,443,763 | A | * | 6/1948 | Dahlgren ............ H02K 7/1012 242/390.2 |
| 2,872,130 | A | * | 2/1959 | Nardone ................. B66D 1/14 242/397.3 |

(Continued)

*Primary Examiner* — Benjamin P Lee
(74) *Attorney, Agent, or Firm* — Robert Schuler

(57) ABSTRACT

A remotely controlled, tethered vehicle system is comprised of a communication network interface, a system command and control module, a power source, a tether cable spooling apparatus and a remotely controlled vehicle that is tethered to the communication, control and power source by a cable that is controlled to be dispensed from or retracted into the spooling apparatus. The spooling apparatus has a spooling mechanism that is controlled to move the cable into and out of the spooling apparatus without using a slip ring device.

18 Claims, 6 Drawing Sheets

(56) References Cited

U.S. PATENT DOCUMENTS

| | | | | |
|---|---|---|---|---|
| 4,324,195 | A * | 4/1982 | Cunningham | B63C 11/48 |
| | | | | 114/312 |
| 5,263,431 | A * | 11/1993 | Wood | B63B 21/66 |
| | | | | 114/244 |
| 5,485,973 | A * | 1/1996 | Nellessen, Jr. | B65H 57/20 |
| | | | | 114/312 |
| 6,276,625 | B1 | 8/2001 | Chee et al. | |
| 8,777,157 | B2 * | 7/2014 | Barrett | B64C 39/022 |
| | | | | 244/115 |
| 10,710,746 | B2 * | 7/2020 | Lombardini | B64F 3/02 |
| 2013/0230378 | A1 * | 9/2013 | Fisher | B66D 1/50 |
| | | | | 414/800 |
| 2015/0275861 | A1 * | 10/2015 | Goldstein | F03D 7/02 |
| | | | | 290/44 |
| 2017/0259941 | A1 * | 9/2017 | Briggs, IV | G05D 1/0866 |
| 2017/0267503 | A1 * | 9/2017 | Mahnken | B66D 1/14 |
| 2018/0118374 | A1 * | 5/2018 | Lombardini | B60L 9/00 |
| 2019/0283869 | A1 * | 9/2019 | Broberg | B64C 39/022 |
| 2020/0211737 | A1 * | 7/2020 | Parr | B66D 1/505 |
| 2020/0225684 | A1 * | 7/2020 | Anderson | G05D 1/0022 |
| 2021/0061487 | A1 * | 3/2021 | Briggs, IV | B64C 39/022 |

* cited by examiner

FIG. 2 TETHER CABLE SPOOLING APPARATUS 10
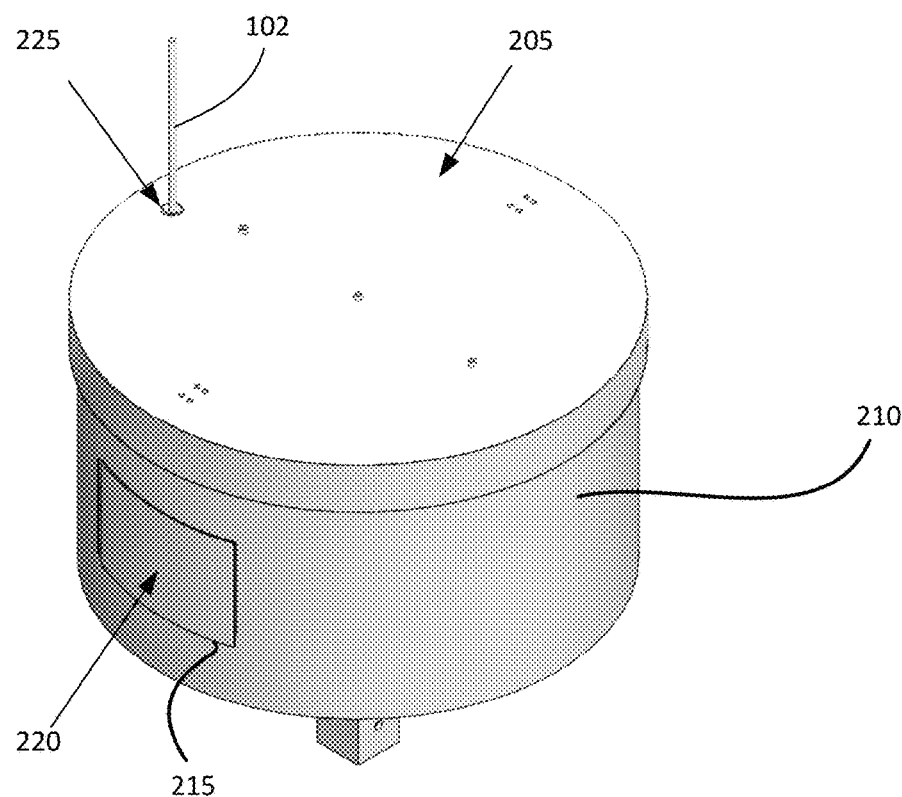
FIG. 3 TETHER CABLE SPOOLING APPARATUS 10
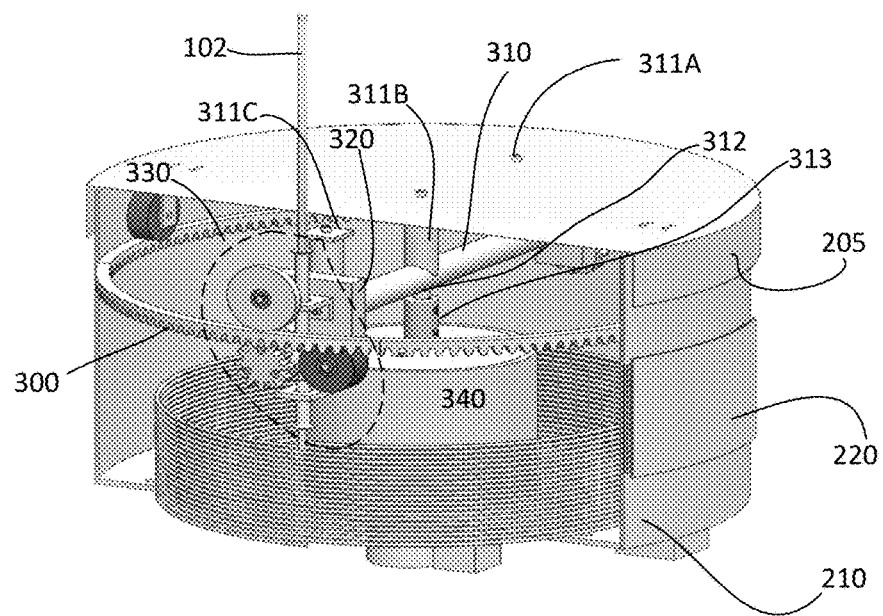

TETHER CABLE SPOOLING APPARATUS

1. FIELD OF THE INVENTION

The present disclosure relates to the tethering of unmanned, remotely controlled vehicles, and to a mechanism for deploying, retracting and storing the vehicle tether cable.

2. BACKGROUND

Unmanned, remotely controlled vehicles which are connected to a tether cable are being used to perform tasks that may be too dangerous for humans to perform, or for tasks that can be performed more economically than a manned vehicle. Such vehicles can be configured with, among other things, various sensors to capture images or weather information and they can be configured with modules that perform wireless communication functions. The tether cable can have a plurality of conductors for the transmission of control signals and electrical power to the vehicle, for the transmission and reception of communication signals to and from the vehicle, and for the transmission of information gathered by one or more sensors mounted on the vehicle. Some conductors can be dedicated to transmitting only power, only control signals, only communication signals or sensor information, or a single conductor can transmit some combination of two or more of power, control signals, communication signals and sensor signals. A base station, to which the tether can be connected in some manner, can have equipment that operates to generate power, equipment that operates to generate various types of control signals and to receive information from sensors mounted on the vehicle, and equipment that operates as a network interface controller between a transceiver mounted on the vehicle and an external communications network. The base station equipment, the tether and the unmanned vehicle together comprise an unmanned, remotely control vehicular system.

Depending upon the task for which the unmanned, remotely controlled vehicle system is designed, the length of the tether cable described above can be longer or shorter as needed. Tether cables having longer lengths typically need a specialized tether spooling apparatus for dispensing and retracting the tether from and to a tether storage device without bending or kinking the cable.

3. BRIEF DESCRIPTION OF THE DRAWINGS

FIG. 2 is a diagram showing a tether cable spooling apparatus.

FIG. 3 is a diagram showing a cutaway view of the tether cable spooling apparatus of FIG. 2.

4. DETAILED DESCRIPTION

Most tether cable spooling mechanisms currently in use employ a slip ring mechanism that operates to transfer electric power and command/control signals from stationary power and signal sources to a tether cable. These slip rings allow the spooling assembly to wind and unwind the tether cable around a rotatable, cylindrically shaped, cable storage container while continually supplying electrical power and command/control signals through the cable to an unmanned, remotely controlled vehicle. Such slip ring mechanisms are complicated devices that can be very expensive and so can add to the overall cost of a remotely controlled vehicle system. Therefor, it would be advantageous to transfer power and signals from the sources to the tether cable without the need for a slip ring mechanism.

We have designed a tether cable spooling apparatus that operates to dispense and to retract a tether cable that is attached to an unmanned, remotely controlled vehicle without the need to transfer electrical power and command/control and other signals from a source to the tether cable via a slip ring mechanism. Our design is simple, durable, and much less expensive than an assembly having a slip ring mechanism that performs a similar cable spooling function. Our tether cable spooling apparatus operates to continuously and smoothly dispense a length of coiled tether cable from a cable storage container so that the remotely controlled vehicle can be controlled to freely move away from the power and signal sources at different rates of speed. Then when the tether cable is retracted into the storage container by the spooling apparatus, the cable is deposited into the storage container in a coiled arrangement such that it is not kinked and can be later easily and smoothly dispensed as necessary to allow the vehicle to move freely away from the command and control module. From another perspective, we have designed a mobile, self-contained, wireless communication network base station comprising an unmanned, remotely controlled vehicle that is tethered to a cable spooling apparatus that operates to dispense and to retract a tether cable connected at one end to the unmanned vehicle and directly connected at a second end to a power source, a command and control signal module and to a wireless communications network.

According to one embodiment, the spooling apparatus is comprised of an armature that can be rotated in a circular motion around a central axis point that is connected to a drive motor. A tether cable spooling mechanism is disposed at one, proximal end of the armature, and it has a pinion gear that engages an annular ring gear such that when the armature is in motion the pinion gear rotates and directly drives a friction wheel that causes the tether cable to move through a tether cable guide between the friction wheel and a pinch wheel.

Figure 1:
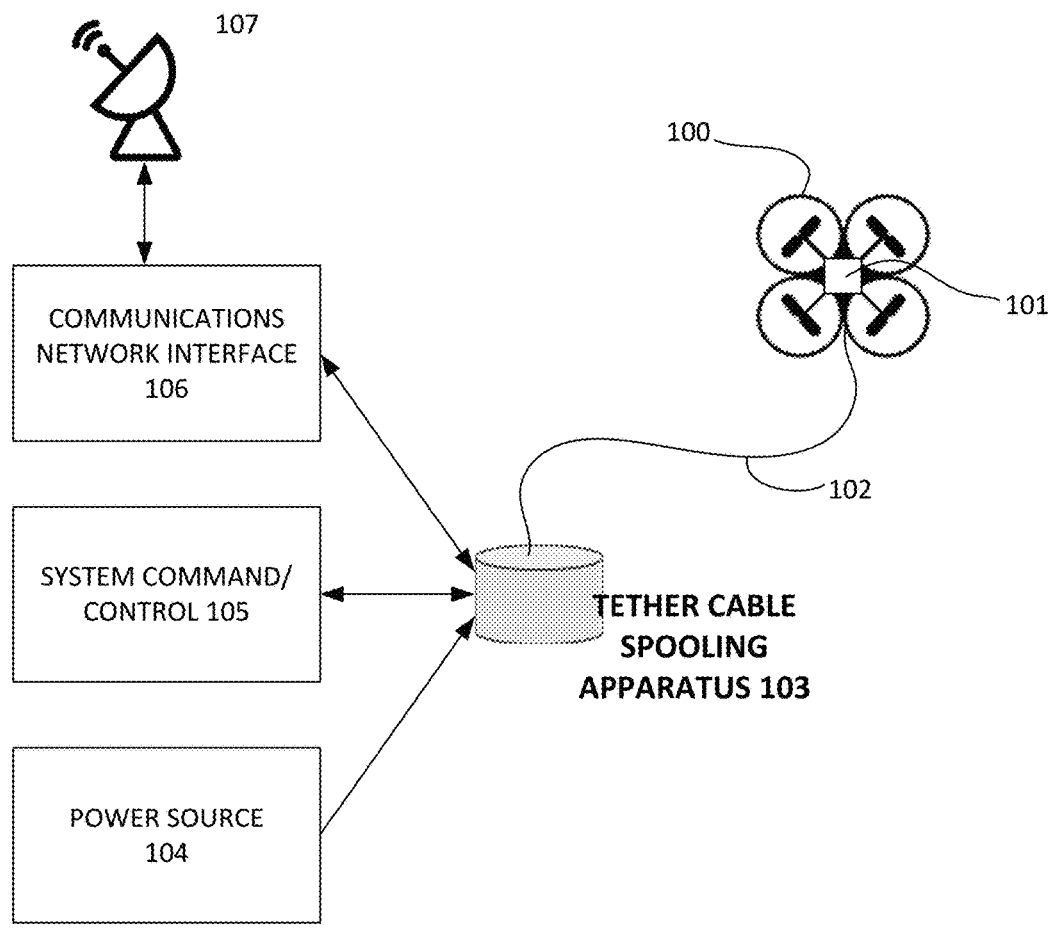
FIG. 1 is a diagram showing elements comprising an unmanned, remotely controlled, aerial vehicle system.

The tether cable spooling apparatus is described with reference to the Figures, in which FIG. 1 is a diagram showing functional elements comprising a remotely controlled, unmanned, tethered vehicle system 10 hereinafter referred to as the vehicle system 10. One, distal end of a tether cable 102 is attached to a remotely controlled, unmanned vehicle 100 (vehicle 100) and the other, proximal end of the cable 102 is attached to a tether cable spooling apparatus 103. The proximal end of the tether cable 102 is connected directly to an AC or DC power source 104 and has electrical conductors for transmitting the operational power to the vehicle 100. The proximal end of the cable 102 is also directly connected to a command and control module 105 and a communications network interface 106. Connected directly in this context means that the proximal end of the tether cable is connected to power and signal sources without an intermediary slip ring arrangement. The system command and control module 105 has functionality that generates vehicle control signals that are transmitted via the cable 102 to the vehicle 100 which are used to control its movement. The module 105 has other functionality that operates to receive sensor information collected by a sensor (not shown) attached to the vehicle 100. The communication network interface 106 can be an interface to a satellite communications system of to a microwave communications system.

The vehicle 100 is illustrated in FIG. 1 as an aerial vehicle, but it can be an underwater vehicle or a land-based vehicle also. The vehicle is comprised of some number of propellers (four in this embodiment) which can be controlled to propel the vehicle into the air and to maneuver the vehicle once airborne. A cellular radio 101 is attached to the vehicle that when airborne operates in the same manner as a cellular tower to receive wireless signals from a mobile device and to sends the signals over the communications network to an appropriate location. The vehicle also has functionality for receiving and processing signals received over the cable 102 from the command and control module 105, and it has a transformer to convert 1550 VDC received from the power source to a lower, 48 VDC that is used by the vehicle. In operation, the system 10 can provide temporary, fixed location wireless network service for emergency communication operations, or it can provide temporary, wireless network services in areas that otherwise do not have these services.

The tether cable 102 is comprised of a flexible sheathing and a plurality of inner conductors for power and signal transmission. The flexible sheathing serves to offload mechanical forces (primarily tensile forces) from the inner conductors created between the spooling apparatus 103 and the vehicle 100 when in flight. The cable 102 can have two electrical power conductors specified (i.e., 22 AWG) for the transmission of a high voltage level, which in one embodiment is 1550 VDC. The cable 102 can have one or more copper or fiber lines for the transmission of command and control signals from the control module 105 to the vehicle 100, and the cable can have one or more copper or fiber lines for the transmission of communication signals between the vehicle and the network interface module 106.

The tether cable spooling apparatus 103, the command and control module 105, the network interface module 106 and antenna 107 can all be mounted in a trailer or some type of container that is mounted on a truck for transport to a particular location that needs temporary mobile communications connectivity. In operation, an individual operating a mobile communications device (i.e., smart phone) can cause a signal having voice, image, or text information to be generated by their mobile device which will be received by the cellular radio 101 on the vehicle 100 if it is within range. This signal is then transmitted from the radio 101, over the cable 102 to the network interface module 106 and over the satellite or microwave network link to the appropriate communication network. Further, command and control signals generated by the command and control module 105 can be transmitted over the cable 102 to the vehicle 100 which the vehicle can use to control flight, and control signals can be sent to the spooling apparatus to control the dispensing or retraction of the tether cable and to control the speed with which this occurs.

Turning now to FIG. 2, which is a more detailed illustration of the tether cable spooling apparatus 10 described earlier with reference to FIG. 1. The spooling apparatus 10 has a top cover 205, a cylindrical cable storage basket 210 having vertical side walls and having a bottom. The basket side has a rectangular opening 215 and an access door 220 that is hinged and serves to cover the opening 215. The top cover 205 has a tether cable opening 225 through which the tether cable 102 moves and is controlled to be dispensed from and retracted to the inside of the cable storage basket 210. The top cover 205 is rotatable with respect to the cable storage basket 210 which, as will be described later, allows the cable to be stored in the basket in a coiled arrangement. While the cable spooling apparatus 10 is shown here to have a solid top cover and to have a cable storage basket having solid sides and bottom, this does not have to be the case. As will be described below with reference to FIG. 3, the spooling apparatus 10 may not need a top cover, and the cable can be stored in something other than a basket with solid walls and bottom, such as a stylizing frame assembly.

Referring now to FIG. 3, which is a view of the same spooling apparatus 10 illustrated in FIG. 2, with the tether cable 102 stored in the basket 220 in a coiled arrangement. This figure shows the armature rotated approximately ninety degrees counter clockwise with respect to the orientation in FIG. 2, the basket 210 is partially cut away and the door 220 is closed. FIG. 3 generally illustrates mechanical elements that are internal to the apparatus 10. An annular ring gear 300 is fixedly connected to and disposed around the entire circumference of the cylindrical wall comprising the cable storage basket 210. A rotatable armature 310 is attached to the top cover 205 with three armature-top cover attachment elements 311A, 311B and 311C, and it is attached to a drive motor (inside a motor cover 340) via a connecting rod 312 and a connection sleeve element 313. Mechanical elements comprising a cable spooling mechanism 330 are attached to a proximal end of the armature 310 via a carrying element 320, and as will be described in more detail later, the mechanism 330 engages with the ring gear 300 which, when the armature is rotating, causes the tether cable 102 to be dispensed from or retracted into the basket 210.

Figure 4A:
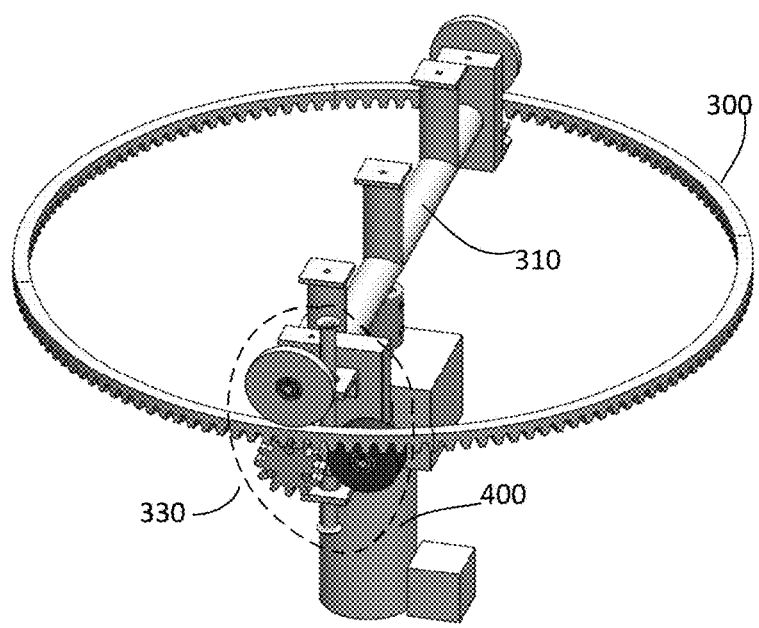
FIG. 4A is a diagram showing a perspective view of components comprising the tether cable spooling apparatus of FIG. 2 without a cover and basket.
Figure 4B:
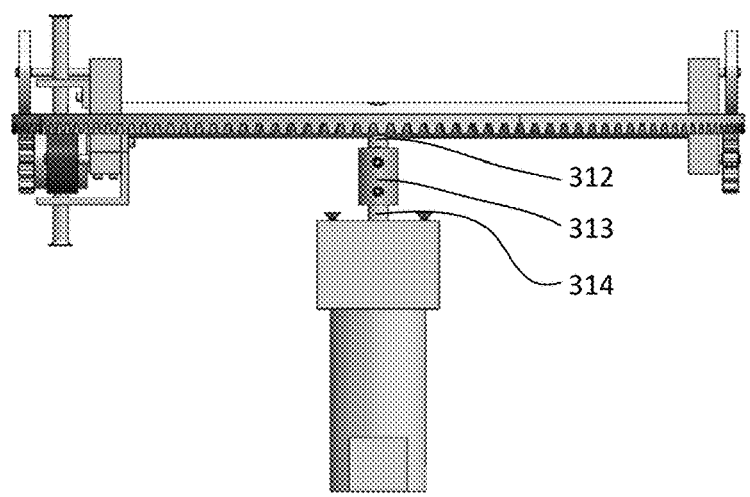
FIG. 4B is a diagram showing another view of the tether cable spooling apparatus of FIG. 4A.
Figure 4C:
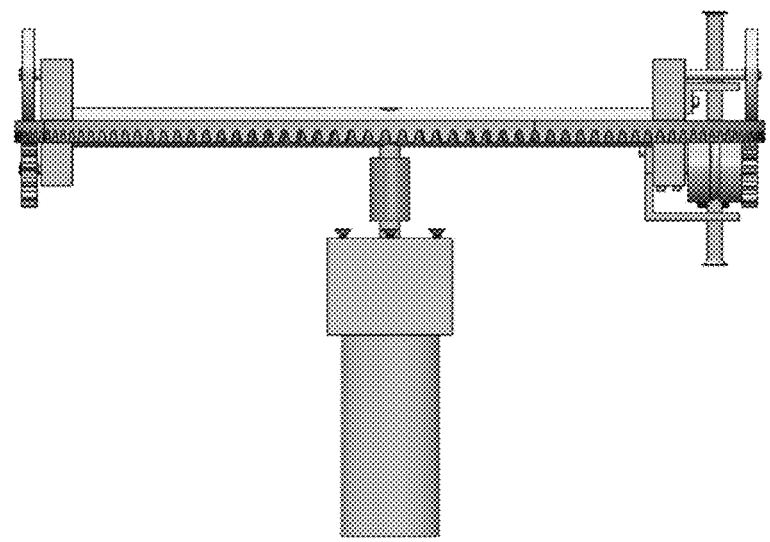
FIG. 4C is a diagram showing a view of the tether cable spooling apparatus rotated 180 degrees from the orientation shown in FIG. 4B.

FIGS. 4A, 4B and 4C are three views of the internal mechanism comprising the spooling assembly 10 described earlier with reference to FIG. 3, but not showing the top cover 205, the cable storage basket 210, and the motor cover 340. FIG. 4A is an illustration of the internal mechanism in perspective showing the annular ring gear 300, the armature 310, the spooling mechanism 330 and a motor 400. FIGS. 4B and 4C are two views illustrating opposing sides of the internal mechanism shown in FIG. 4A. FIG. 4B shows the armature to motor shaft connecting rod 312, the sleeve 313 and a motor drive shaft 314. The sleeve serves the purpose of mechanically attaching the connecting rod 312 to the motor drive shaft 314. The motor 400 in one embodiment is a 0.7 horse power DC motor that operates to rotate the armature 310.

Figure 5A:
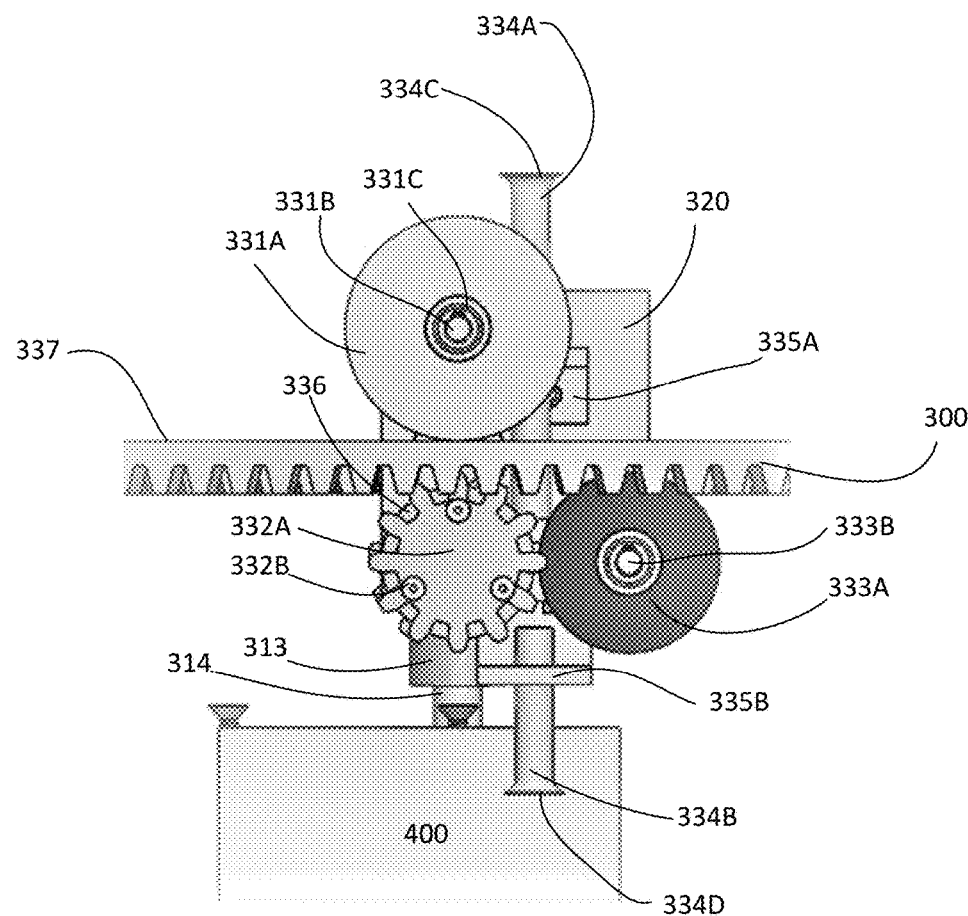
FIG. 5A is a diagram of a tether cable spooling mechanism 330.
Figure 5B:
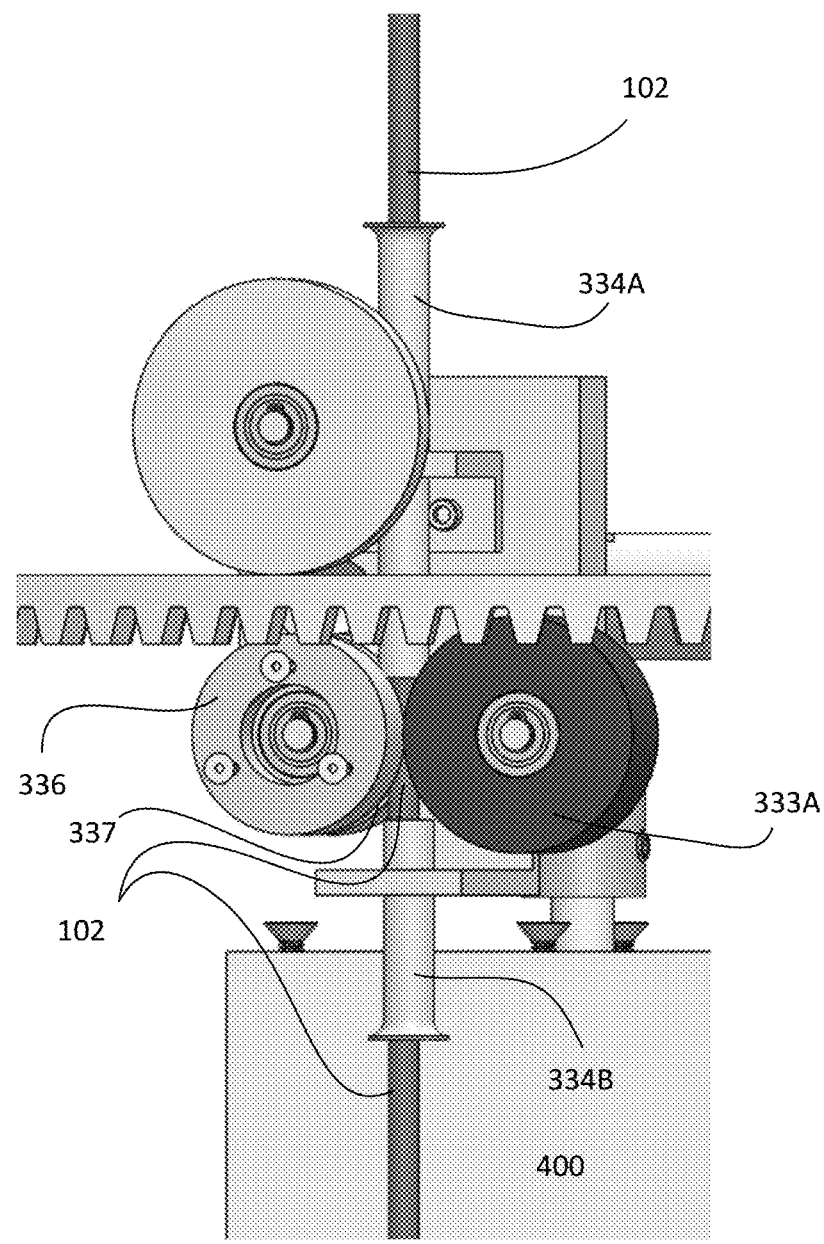
FIG. 5B is a diagram of the tether cable spooling mechanism 330 of FIG. 5A without a pinion gear.

Turning now to FIG. 5A which is a diagram of the spooling mechanism 330 illustrated in FIG. 3. As described earlier, the mechanical elements comprising the spooling mechanism 330 are mounted to the carrying element 320 which is in turn fixedly connected to the proximal end of the armature 300. The spooling mechanism 330 is comprised of an upper wheel 331A, a pinion gear 332A, a pinch wheel 333A, a friction wheel 336 (more easily seen in FIG. 5B) that is attached to a side of the pinion gear with three bolts, one of which is marked at 332B, and the mechanism 330 is also comprised of an upper and lower tether cable guides, 334A and 334B respectively. The cable guides are hollow tubes with a flared end having an inside diameter large enough to allow a tether cable to easily pass through, and the guides are fixedly attached to the carrying element 320 by upper and lower support brackets 335A and 335B respectively. A top most opening 334C of the cable guide 334A and a lower most opening 334D of the cable guide 334B are flared to allow the tether cable to pass through the guides without being abraded in any way. The upper wheel 331A is attached to an axel 331B which is in turn fixedly attached to the carrying element 320 and it rotates as it rides on a top surface 337 of the annular ring gear 300 as the armature is rotated. The pinion gear 332A is fixedly attached to the friction wheel 336 which is attached to and rotates around an axel illustrated in FIG. 5B which is in turn fixedly connected to the carrying element 320. Male gear elements comprising the pinion gear 332A engage with female gear elements comprising a lower surface of the ring gear 300, and the pinion gear rotates as the armature 310 is driven by the motor 400, which in turn causes the friction wheel to rotate as well. The pinch wheel 333A is attached to and rotates around an axel 333B which is fixedly attached to the carrying element 320. And finally, the spooling mechanism 320 has two tether cable guides through which the tether cable (not shown in FIG. 5A) moves as the armature is rotated. There is an upper cable guide 334A and a lower cable guide 334B that is registered under and separated from the upper cable guide by a distance so as not to interfere with the rotation of the friction and pinch wheels which operate to move and retain the cable as it is dispensed from or retracted into the storage basket 210. More specifically, both the friction wheel and the pinch wheel are in continuous contact with the tether cable, and force exerted by one or the other or both of these wheels on the tether cable can be adjusted so that the necessary frictional forces are applied to the cable for movement. The annular ring gear 300 can be composed of a metallic material and the upper wheel 331A can be made of either a metallic or plastic material. The pinion gear can be a metallic material such as aluminum, and the friction wheel 336 and the pinch wheel 333A can be composed of either a plastic or rubber like material that provide a sufficient amount of frictional force to move the tether cable or to securely retain the cable when not in movement. The upper and lower cable guides can be composed of a metallic material FIG. 5B shows the same spooling mechanism 330 described with reference to FIG. 5A with the exception of the pinion gear 332A being removed so that the friction gear 336 can be readily seen. This figure also shows the tether cable 102 disposed within the cable guides 334A and 334B and between the friction and pinch wheels 336 and 333A respectively. Though not easily seen in FIG. 5B, but readily seen in FIG. 6B, the friction wheel has a channel 337 machined into a surface that presents a larger surface area for contact with the tether cable to prevent the cable from slipping with respect to the friction wheel during the time it is being dispensed or retrieved into and out of the storage basket 210, or to prevent slippage when the cable is stationary during a time that the vehicle 100 is in operation. The machined channel 337 extends 360° around the circumference of the friction wheel surface and so is in contact with the cable 102 at all times. In operation, when the armature 310 is driven to rotate by the motor 400, the pinion gear 332A is caused to rotate, due to it being engaged with the ring gear, and the pinion gear rotation drives the friction wheel 336 to rotate in either a clockwise or counter-clockwise direction (depending upon the direction of armature rotation and whether the cable is being dispensed or retracted) which causes the tether cable 102 to be moved between the friction wheel and the pinch wheel and the through the cable guides to be either retracted into or dispensed from the storage basket 210. The tether cable is deposited in the bottom of the basket in a circular pattern as the spooling mechanism is moved by the rotating armature. As described earlier, the spooling apparatus 10 advantageously enables electrical power and control signal connectivity between the power and signal sources and the tether cable without the need for an expensive and complex slip ring mechanism.

Figure 6A:
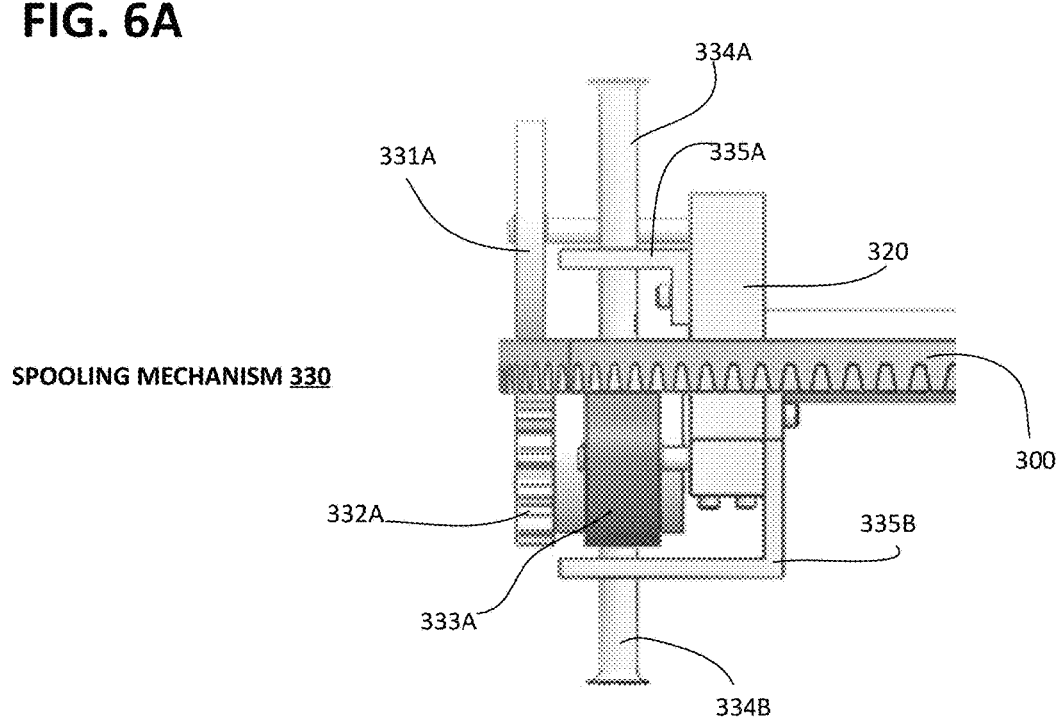
FIGS. 6A and 6B are two difference views of the spooling mechanism in FIG. 5A.
Figure 6B:
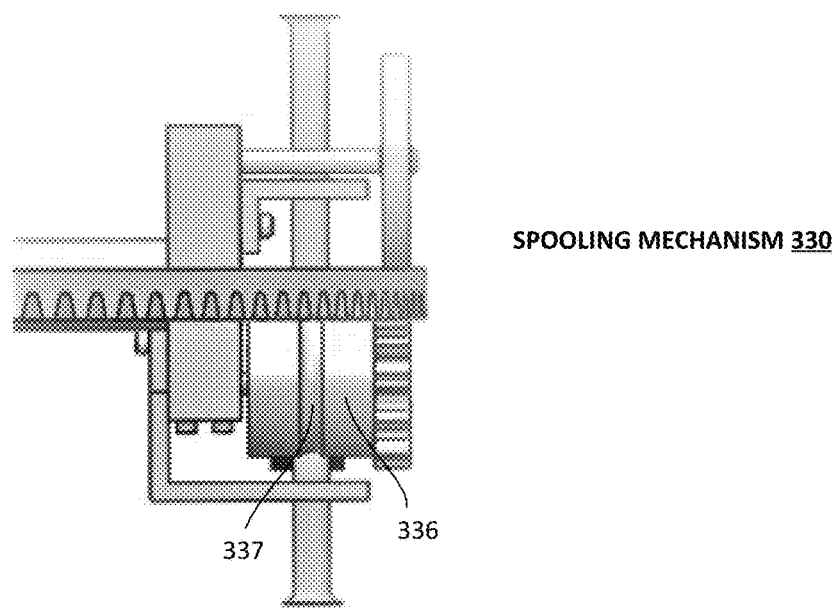

Turning now to FIGS. 6A and 6B, which are two different views of the spooling mechanism 330 described above with reference to FIG. 5B. FIG. 6A illustrates the orientation of the pinch wheel 333A with respect to the upper and lower cable guides and FIG. 6B illustrates the orientation of the friction wheel 336 with respect to the upper and lower cable guides. Both FIGS. 6A and 6B also clearly illustrate the attachment of the upper and lower cable retention brackets to the carrying element 320 and illustrate in manner in which the upper and lower cable guides are retained by the retention elements. FIG. 6B shows the machined channel 337 comprising the surface of the friction wheel 336 that comes into contact with the tether cable 102. The channel 337 has a full or partial semicircular profile with a radius that is sized to accept the tether cable of a particular diameter.

As described earlier, this spooling mechanism is suitable for use with any type of remotely controlled, unmanned, tethered vehicle. The mechanism can be easily transported and deployed to any location that is accessible by a vehicle able to pull the trailer or carry the container having the communications, command and control and power supply modules.

The forgoing description, for purposes of explanation, used specific nomenclature to provide a thorough understanding of the invention. However, it will be apparent to one skilled in the art that specific details are not required in order to practice the invention. Thus, the forgoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

We claim:

1. A remotely controlled vehicle tether cable spooling apparatus, comprising:
an annular ring gear fixedly attached at two or more points to a stabilizing frame assembly; and
a tether spooling mechanism attached to a proximal end of a rotatable armature connected at a center point to a shaft driven by a motor that is fixedly attached to the stabilizing frame assembly;
wherein the tether spooling mechanism has a pinion gear that engages the annular ring gear and directly drives a friction wheel attached to it as the armature is rotated causing a vehicle tether cable disposed between the friction wheel and an opposing pinch wheel to be moved through a tether cable guide.

2. The spooling apparatus of claim 1, further comprising the tether spooling mechanism operating to retract the tether cable and to deposit it in a continuous circular coil inside the stabilizing frame assembly as the armature is rotated in a first direction and dispense the tether cable from the stabilizing frame assembly as the armature is rotated in a second direction.

3. The spooling apparatus of claim 1, wherein the tether cable guide is comprised of an upper and a lower cable guide and an uppermost end of the upper cable guide and a lowermost end of the lower cable guide are flared.

4. The spooling apparatus of claim 3 wherein the upper and the lower cable guides are separated by a distance that allows the friction and the pinch wheels to come into contact with the tether cable.

5. The spooling apparatus of claim 1, wherein the tether cable has two copper conductors for both electrical and communication and vehicle control signal transmission.

6. The spooling apparatus of claim 5, further comprising one or more fiber optic conductors for communication and vehicle control signal transmission.

7. The spooling apparatus of claim 5, wherein the copper conductors are directly connected at a proximal end to an electrical power source.

8. The spooling apparatus of claim 6, wherein the fiber optic conductors are directly connected at the proximal end to either or both of a communication network and a vehicular control module.

9. The spooling apparatus of claim 1, wherein a distal end of the tether cable is attached to the remotely controlled vehicle.

10. A mobile, self-contained, wireless communication network base station, comprising:
 a remotely controlled, unmanned vehicle having a wireless transceiver is connected to a tether cable spooling apparatus by a tether cable, the tether cable having one or more conductors for each of electrical power, command and control signal and wireless network communications signal transmission, and each of the plurality of conductors comprising the tether cable are directly connected to a respective power source, a command and control signal source and a wireless communication network interface; and
 a tether cable spooling mechanism comprising the spooling apparatus that operates to dispense and to retrieve the tether cable from and to a cable storage container in response to the command and control signals, and the wireless transceiver comprising the unmanned vehicle operates to receive wireless signals and sending them over the wireless network communication conductor comprising the tether cable to the wireless network interface;
 wherein the tether cable spooling apparatus has an annular ring gear fixedly attached at two or more points to a stabilizing frame assembly, and has a tether spooling mechanism attached to a proximal end of a rotatable armature connected at a center point to a shaft driven by a motor that is fixedly attached to the stabilizing frame assembly, the tether spooling mechanism comprising a pinion gear that engages the annular ring gear and directly drives a friction wheel attached to it as the armature is rotated causing a vehicle tether cable disposed between the friction wheel and an opposing pinch wheel to be moved through a tether cable guide.

11. The spooling apparatus of claim 10, further comprising the tether cable spooling mechanism operating to retract the tether cable and to deposit it in a continuous circular coil inside the stabilizing frame assembly as the armature is rotated in a first direction and dispense the tether cable from the stabilizing frame assembly as the armature is rotated in a second direction.

12. The spooling apparatus of claim 10, wherein the tether cable guide is comprised of an upper and a lower cable guide and an uppermost end of the upper cable guide and a lowermost end of the lower cable guide are flared.

13. The spooling apparatus of claim 12 wherein the upper and the lower cable guides are separated by a distance that allows the friction and the pinch wheels to come into contact with the tether cable.

14. The spooling apparatus of claim 10, wherein the tether cable has two copper conductors for both electrical and communication and vehicle control signal transmission.

15. The spooling apparatus of claim 14, further comprising one or more fiber optic conductors for communication and vehicle control signal transmission.

16. The spooling apparatus of claim 14, wherein the copper conductors are directly connected at a proximal end to an electrical power source.

17. The spooling apparatus of claim 15, wherein the fiber optic conductors are directly connected at the proximal end to either or both of a communication network and a vehicular control module.

18. The spooling apparatus of claim 10, wherein the distal end of the tether cable is attached to the remotely controlled vehicle.

* * * * *